Dec. 24, 1968      R. CARRERA      3,417,743

TRAINING AND DIAGNOSTIC APPARATUS

Filed June 23, 1965      2 Sheets-Sheet 1

Dec. 24, 1968   R. CARRERA   3,417,743
TRAINING AND DIAGNOSTIC APPARATUS
Filed June 23, 1965   2 Sheets-Sheet 2

United States Patent Office 3,417,743
Patented Dec. 24, 1968

3,417,743
TRAINING AND DIAGNOSTIC APPARATUS
Rafael Carrera, 5300 Westband Ave.,
Bethesda, Md. 20016
Filed June 23, 1965, Ser. No. 466,386
5 Claims. (Cl. 128—2)

ABSTRACT OF THE DISCLOSURE

An apparatus which comprises a flexible receptacle shaped to fit over the male penis, a plurality of pressure sensitive devices or sensors fastened at spaced positions on the receptacle, signalling and/or recording equipment and a plurality of connecting means between the pressure sensitive devices and the signalling and recording equipment. The receptacle is placed over the penis prior to emission and the sensors provide signals whereby pressure between the penis and the walls of the vagina increases above a pre-set minimum in the respect areas.

---

The present invention relates to a device useful for training and gaining control of the muscles which function during sexual relations and providing information useful for physicians and others studying and giving advice to married couples with respect thereto. More particularly, the device is constructed to detect movement and action of the genital organs and provide signals and/or a record thereof.

Proper adjustment to sexual relations by married persons is a significant element of happy marriage. Unsatisfactory adjustment can and frequently does lead to unhappiness and in many cases effects on personality. While there is controversy on whether high divorce rates can be attributed solely or perhaps even principally to failure to reach an adequate adjustment, nevertheless there is reason to believe that this is a significant factor in many cases. Therefore, it is important that married persons learn to perform their respective roles as well as possible and that physicians have the means available to assist them in doing so.

Sexual relation is a physical activity requiring coordinated functioning of various body muscles which must be learned by study and practice in much the same way as a sport such as golf. There are certain elements of instinct which help in learning process, and some of the muscles involved are involuntary and not subject to conscious control, but just as there are wide variations in the ability of persons to learn to play golf, there are many persons who have considerable difficulty in learning to carry out properly the portions of sexual relationship which are subject to control. Unfortunately, this is a much more serious problem than an inability to learn golf. A person who cannot learn that sport may try other forms of physical exercise such as swimming, walking, tennis, and the like, but there is no real substitute for adequate sexual relationships in marriage. As indicated above, an inability to find a satisfactory relationship can cause frustration, hostility and consequent personality disturbances as well as an extramarital sexual outlet.

Persons having difficulty in these respects frequently seek medical assistance, and it is a principal object of the present invention to provide an apparatus which will aid physicians in rendering assistance to them. The apparatus is constructed to help a person in learning whether his own actions are correct so as to stimulate the sensitive anatomical members of his spouse. That is, since satisfactory sexual relationship depend on each person participating in such a way that his partner receives desired sensations, it is important for him to know what effect his own muscular activity has on his spouse. With this knowledge, he can learn to control his own activity to provide maximum satisfaction for his partner. Therefore, it is an object of the present invention to permit persons to obtain this information. It also is desirable for physicians to have objective information regarding the activity of their patients so that they need not depend on the patients' own subjective observations; therefore, another object of the invention is to provide a record which can be studied by a physician.

Briefly stated, the invention achieves these objects by means of an apparatus which comprises a flexible receptacles shaped to fit over the male penis, a plurality of pressure sensitive devices or sensors fastened at spaced positions on the receptacle, signalling and/or recording equipment and a plurality of connecting means between the pressure sensitive devices and the signalling and recording equipment. The receptacle is placed over the penis prior to emission and the sensors provide signals whereby pressure between the penis and the walls of the vagina increases above a pre-set minimum in the respective areas.

Illustrative embodiments are shown in the drawings, in which

Figure 1:
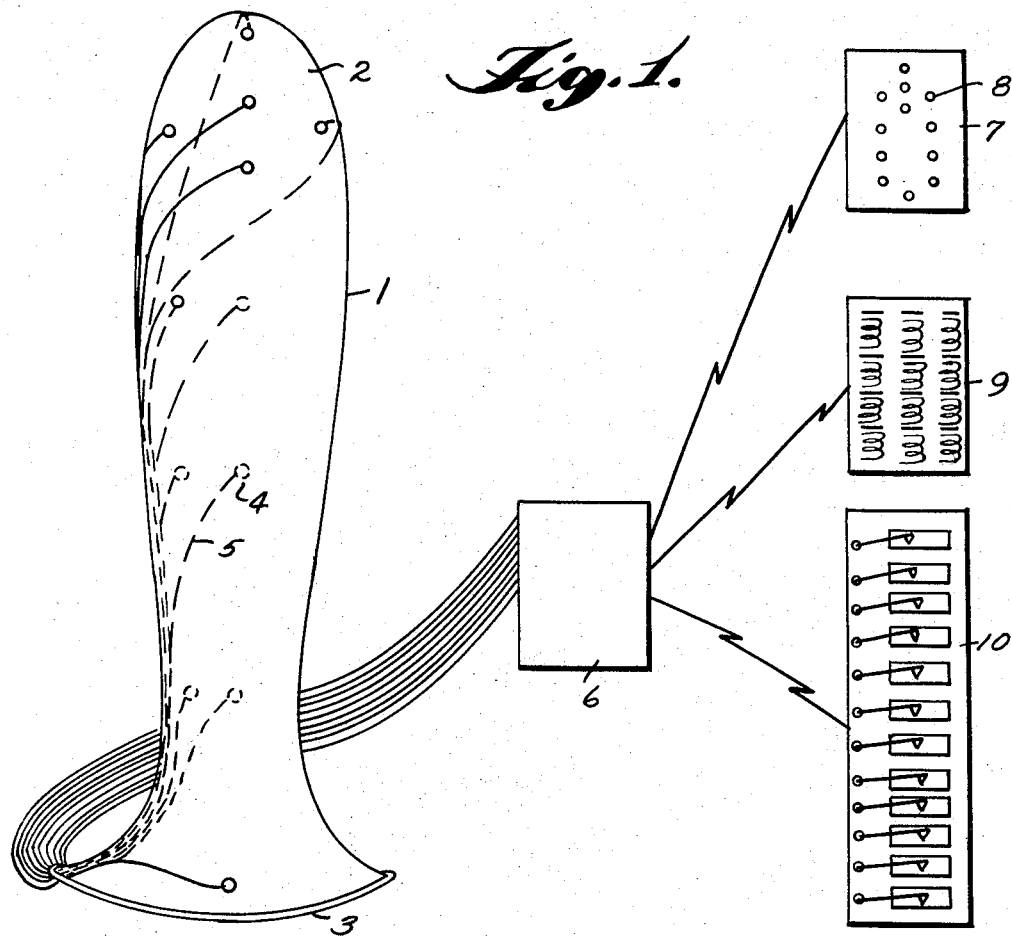
FIGURE 1 is a partially schematic view showing the receptacle unit operatively connected to various signalling and recording devices.

As shown in FIGURE 1, the apparatus comprises an elongated receptacle 1 having a closed end 2 and an open end 3. The receptacle may be approximately cylindrical, but preferably is somewhat constricted a short distance from the open end 3 to assure a tight fit and prevent longitudinal movement with respect to the penis. The open end may be flared outwardly for convenience in insertion and to minimize bending stresses on the leads connected to the sensors.

The receptacle may be composed of thin rubber, animal tissue, synthetic plastic or any other material known to be useful for contraceptive devices. However, it need not be impermeable to the flow of seminal fluids since its function is not principally contraceptive, and for persons having religious objections to contraceptive devices or living in States where such devices are unlawful, the closed end 2 may have an opening to permit free flow of such fluids.

A plurality of sensors 4 are secured to the receptacle at spaced points. Numerous fastening means may be employed. For example, if the receptacle is composed of rubber, the sensors may be embedded in the rubber when the receptacle is formed. They also may be held to the interior of the receptacle by thin, transparent, pressure-sensitive tape, and numerous other fastening means will readily suggest themselves to persons skilled in the art.

The sensors may be of the electrical, fluid pressure or any other type by means of which a communicable signal is generated in response to pressure. If electrical, the device may be a switch, a variable resistor, a variable capacitor, etc. If of the fluid pressure type, the fluid may be gaseous or liquid, a suitable material being a mixture of glycerine and water or any other liquid of the type used in catheters.

It is preferred that the sensor provide a variable output which increases with an increase of pressure against it. Ordinarily, the signalling and/or recording device will be adjusted to show no response unless a predetermined minimum pressure is applied. However, it is desirable that as the pressure increases above that minimum there be a continuous or step-wise increase in the response of the signalling and/or recording device.

From each of the sensors, there is a lead 5 which may be insulated electric wire or a small diameter fluid conduit. In the case of wire, there may be a grounded common lead connected to all of the sensors to reduce the number of wires. These leads may be about three feet long and are connected to a control unit 6. This actuates an appropriate signalling and/or recording device. For purposes of illustration, there are shown in the drawing a light panel 7 having a plurality of lamps 8, a musical tone generator 9 and a multi-pen chart recorder 10, all of conventional design. In the form shown, one light, musical tone or pen is actuated by one sensor. However, for information storage, the signals can be combined with different carrier frequencies and recorded on magnetic tape. It also is possible to convert the signals to a succession of pulses which are counted, and to utilize various known information handling techniques.

The information from two or more sensors can be combined to provide a single signal or compared to determine differences in pressure. It will be appreciated, therefore, that while particular techniques are suggested, no limitation thereto is intended.

Figure 3:
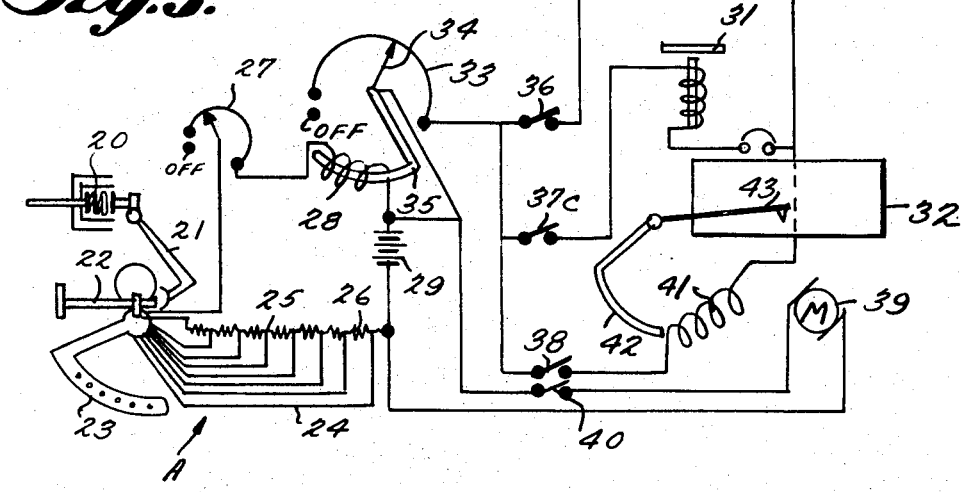
FIGURE 3 is a schematic view of a converter for use when the sensor is a small capsule containing fluid, the converter generating an electric signal which actuates a signalling and/or recording device.

In FIGURE 3, there is illustrated schematically one form of control unit actuated by fluid pressure. The fluid moves a piston 20 to which is connected a bellcrank 21. The bellcrank is positioned to push an adjustable rod 22 after movement a predetermined distance and the rod pivots a multi-contact sealed mercury switch 23. The rod is threaded in the switch above its pivot point for axial movement toward and away from the bellcrank to reduce or increase the distance through which the bellcrank must move prior to pushing the rod, and to adjust for gas or liquid temperature changes.

The mercury switch is of conventional design having a curved tube in which there are several contacts and as the tube is turned the number of contacts touching the mercury increases. The contacts are connected through leads 24 to a succession of taps 25 between series connected resistors 26. As the mercury switch is turned, increasing numbers of resistors are bypassed through the mercury, thereby reducing the resistance of the unit, which consequently functions as a rheostat which is indicated generally by A in the drawing.

The rheostat A is a variable element of a circuit designated by B and which includes a manually operated variable resistor 27, a coil 28 and a battery 29. Another circuit C is provided which includes the battery 29, the signalling and recording devices 30, 31 and 32 and a variable resistance element 33 controlled by circuit B. The element 33 has a sliding contact 34 moved by an armature 35 which is operated by coil 28 in accordance with the current flow in circuit B.

Signal light 30, chime 31 and the recording unit 32 are connected in parallel from one end of variable resistance element 33 to one end of battery 29, controlled respectively by switches 36, 37 and 38, and the recording unit includes a chart drive motor 39 connected across the terminals of battery 29 through a switch 40. In the circuit of the chime 31 there is a delayed intermittent temperature breaker of the type used to cause lights to blink, thus providing a succession of chime sounds as the signal continues. The chime is tuned to give a distant tone different from the tones of other chimes connected via similar circuits to other sensors. In the circuit of the recorder 32, there is a coil 41 which controls an armature 42 and a pen 43 connected to the armature. It will be appreciated that a conventional recorder using a balancing servo motor and adapted to measure current may be used.

Figure 4:
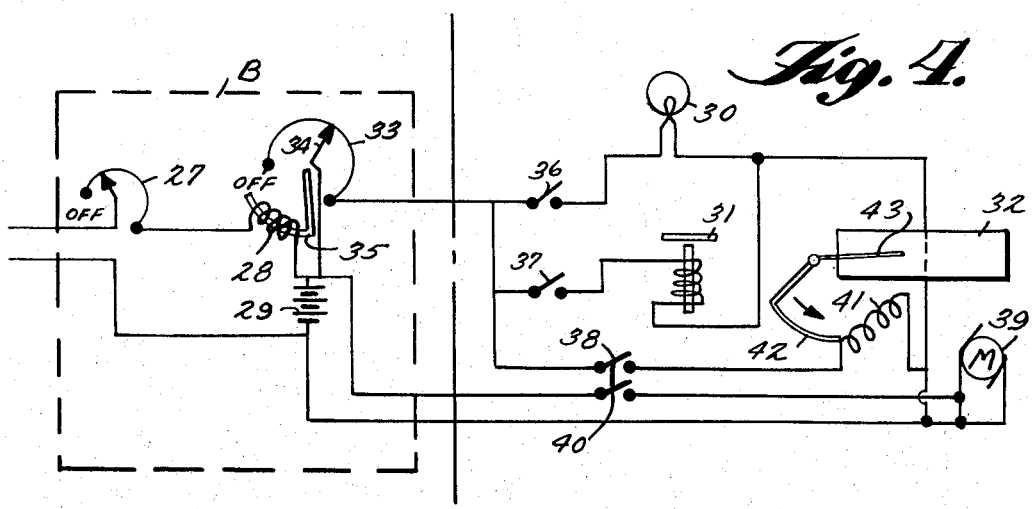
FIGURE 4 is a schematic view of a control unit for use with a sensor which is a variable resistance electrical element to actuate a signalling and/or recording device.
Figure 2:
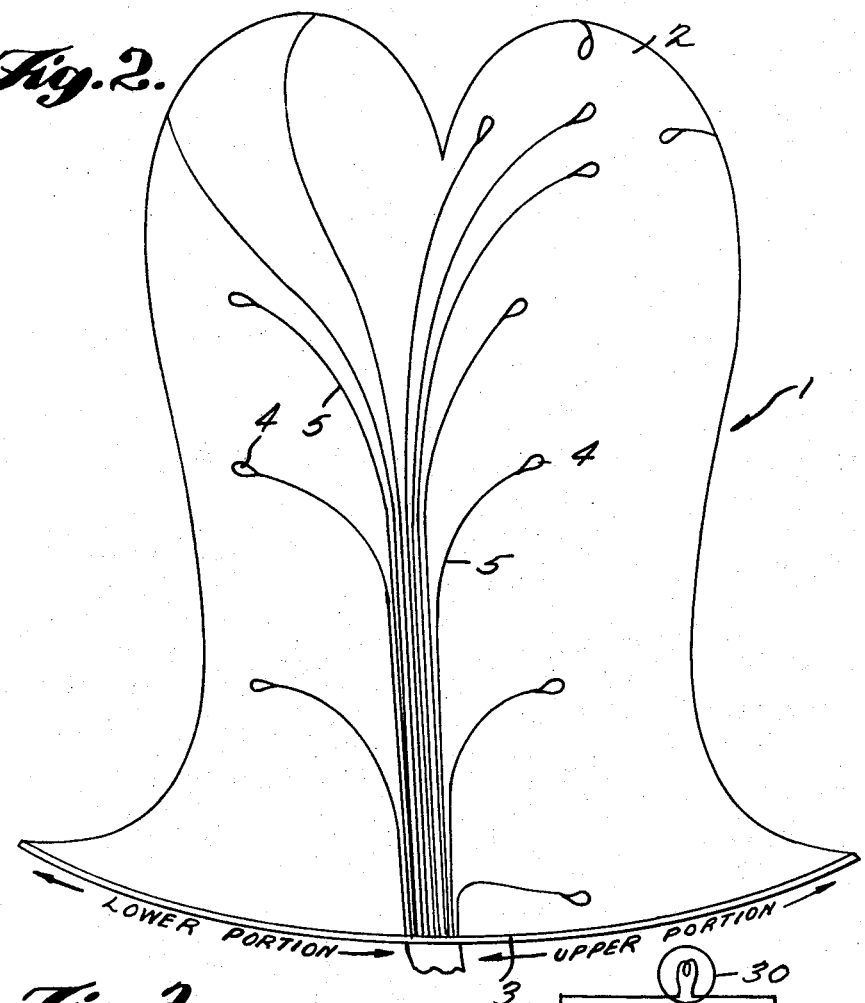
FIGURE 2 is a view of the receptacle unit cut open and laid flat.

FIGURE 4 illustrates a similar circuit for use with variable resistance sensors, comparable parts being indicated by the same numbers as in FIGURE 4. However, the rheostat A is replaced by the variable resistance of the sensor.

Considerable variation in the placement of sensors is possible. These may be positioned to provide any information considered necessary by a physician. However, in the embodiment shown, there are nine sensors placed in the upper portion and three in the lower portion. The sensor in the upper portion near the open end 3 will indicate contact with the clitoris and those near the closed end will detect contact of the glans penis, etc. The leads 5 are placed along one side of the receptacle, since this minimizes discomfort, but other arrangements are permissible.

To understand the functioning of the apparatus of this invention, it is necessary to consider that stimulation of various sexual responses depends in part on the psychological effects of many forms of stimulation not involving the physical contact of the genital organs and in part on friction and pressure exerted by such contact. In some respects, pressure and frictional contact are subject to voluntary control, and in other respects, they are regulated by bodily mechanisms not subject to direct conscious control. The apparatus measures both types of effect and therefore determines whether the more purely mechanical movements are properly performed and also whether the psychological responses are producing the desired functioning of involuntary muscles.

In the male, sensations are created by stimulation of nerve fibers in the penis; the greatest sensitivity is in the glans penis at its distal extremity, but considerable sensitivity also is present in other portions. In the female, the most sensitive area is the clitoris, which is the female's counterpart of the male penis. Additional sensitivity is also present in the vagina, especially near its opening into the vulva.

The embodiment of the apparatus shown includes a sensor near the base of the penis in a position where it will respond to movement against the clitoris. Therefore, it permits practicing to create the maximum frequency and intensity of contact in this area. For example, the female can contribute by bending forward and by practice will find that certain other body positions will facilitate such contact.

Similarly, the equipment will include one or more sensors near the tip of the penis which will measure contact between it and the cervix. Therefore, if the female will attempt to remain stationary during stroking by the male, he may learn to recognize when his movements are most satisfactory. This can be repeated with the female in many positions, since changes in her position will, for example, affect the distance between the cervix and the mouth of the vagina.

Another use of the device is to help the female gain control of the voluntary muscles surrounding the vagina. These are portions of the levator ani muscle which extend rearwardly from the pubic bone and include sections on both sides of the vagina which interdigitates to a certain extent. Many women can learn to control individual portions of these muscles to compress the walls of the vagina and also provide some movement which creates additional stimulation to the male. Other women do not have such refined voluntary control and can only produce a general contraction of the muscles of the pelvic floor. However, they may, by practice, learn better control. A satisfactory way for this to be learned is for the male to be still after insertion of the erect penis and the female may watch the effect of her efforts to use these muscles. The same procedure can be used to enable the female to learn to control the muscle which enarches the mouth of the vagina.

When the female reaches a sufficient state of excitation, there are changes in several structures which lead to further stimulation of the male and also indicate the intensity of her phychic response. The muscles of the vaginal walls are of the involuntary type and are supplied with blood vessels to have some of the characteristics of erectile tissue. There is also a mass of erectile tissue surrounding the opening of the vagina. When the female's excitation becomes sufficiently intense, these compress against the penis and increase friction. Since the apparatus measures pressure, it can determine whether such pressure is developed and whether it is sufficiently high. It can enable the patients to learn whether these responses are influenced by their choice of position, and how to recognize in their own sensations when this pressure is increasing.

The female response, especially at climax, includes rhythmic contractions of the muscles of the vaginal walls and waves of contractions which spread from one portion to another. These provide great stimulation to both persons. Since there are a plurality of sensors, these can be detected and recorded as a further indication of the adequacy of the female response.

The equipment can permit each patient to correlate his own physical sensation with the mechanical movements and contacts of the genital organs and to thus coordinate his own movements with respect to the response of the other. It also permits obtaining information on any limitations created by the physical relations of the male and female genitals, with respect to size and position, and help the married couple by experimentation with position and practice to learn to minimize these limitations.

The information made available to a physician is useful in these respects. He can advise his patients with more objective knowledge of their procedures and problems. He also may be able to recognize physical abnormalities which require surgical or other treatment and which might have been overlooked otherwise.

It will be appreciated that various changes may be made in the details of construction or mode of operation of the apparatus. For example, it is possible to use combined electric and hydraulic or gaseous sensing systems to produce the most suitable sensor. Therefore, it is not intended to limit the scope of the invention to the preferred embodiments described, but only as defined in the appended claims.

What is claimed is:

1. A device useful for training married couples to achieve maximum efficiency in sexual relations comprising a vaginally-insertable flexible receptacle shaped to receive the male penis, a plurality of spaced pressure-sensitive devices secured to said receptacle and independently responsive to pressure against the inner and outer surfaces of the receptacle to individually generate signals, and means for independently transmitting each of said signals.

2. A device useful for training married couples to achieve maximum efficiency in sexual relations comprising a vaginally-insertable flexible receptacle shaped to receive the male penis, a plurality of pressure-sensitive devices secured to said receptacle and independently responsive to pressure against the inner and outer surfaces of the receptacle to individually generate signals, means for independently transmitting each of said signals and indicating means operatively connected to said transmitting means to independently indicate a plurality of said signals.

3. A device useful for training married couples to achieve maximum efficiency in sexual relations as set forth in claim 2 in which said indicating means comprises a plurality of lights and said pressure-sensitive devices are independently connected by said signal transmitting means to individual lights to provide visual indications of pressure against the respective pressure-sensitive devices.

4. A device useful for training married couples to achieve maximum efficiency in sexual relations as set forth in claim 2 in which said indicating means comprises a plurality of sound generating devices and said pressure-sensitive devices are independently connected to said sound generators to provide audible indication of pressure against said pressure-sensitive devices.

5. A device useful for training married couples to achieve maximum efficiency in sexual relations as set forth in claim 2 in which said indicating means provides a permanent record of said signals for diagnostic evaluation.

References Cited

UNITED STATES PATENTS

| 1,282,908 | 10/1918 | Miller | 128—2 |
| 2,507,858 | 5/1950 | Kegel | 128—2 |
| 2,755,796 | 7/1956 | Boucke | 128—2 |
| 2,875,750 | 3/1959 | Boucke | 128—2.05 |
| 3,176,681 | 4/1965 | Smith | 128—2.05 |
| 3,189,024 | 6/1965 | Smith | 128—2.05 |
| 3,239,935 | 3/1966 | Shackelford | 32—19 |
| 3,258,006 | 6/1966 | Vishnevsky et al. | 128—2 |

FOREIGN PATENTS

| 241,199 | 1/1926 | Great Britain. |
| 239,216 | 11/1911 | Germany. |

L. W. TRAPP, *Primary Examiner.*

U.S. Cl. X.R.

128—79